US006213637B1

(12) United States Patent
Leidenberger

(10) Patent No.: US 6,213,637 B1
(45) Date of Patent: Apr. 10, 2001

(54) IMAGE RECEIVER WITH A RASTER MOVABLE TO A STANDBY POSITION

(75) Inventor: Stefan Leidenberger, Effeltrich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/457,129

(22) Filed: Dec. 9, 1999

(30) Foreign Application Priority Data

Dec. 21, 1998 (DE) ................................ 198 59 200

(51) Int. Cl.[7] .................................................. G03B 42/02
(52) U.S. Cl. ............................................. 378/189; 378/98.8
(58) Field of Search ............................. 378/189, 28, 32, 378/29, 98.8; 250/315

(56) References Cited

U.S. PATENT DOCUMENTS 3,936,642 * 2/1976 Lajus et al. ........................ 250/469
3,988,583 * 10/1976 fukase et al. ...................... 250/315
5,185,772 * 2/1993 Shirouzu et al. .................... 378/29

FOREIGN PATENT DOCUMENTS

PS 67 025   5/1969 (DE).

* cited by examiner

Primary Examiner—Robert H. Kim
Assistant Examiner—Irakli Kiknadze
(74) Attorney, Agent, or Firm—Schiff Hardin & Waite

(57) ABSTRACT

Image receiver for a radiology system, particularly a solid-state detector, has a raster that can be arranged in front of the receiver plane in the beam path and that can be moved into a standby position outside of the beam path when not in use, wherein a standby receptacle mount for the raster is provided in the receiver housing, on the side of the recording cassette that faces away from the radiation source.

5 Claims, 2 Drawing Sheets

IMAGE RECEIVER WITH A RASTER MOVABLE TO A STANDBY POSITION

BACKGROUND OF THE INVENTION

1. Field of the Invention

The present invention relates to an image receiver for a radiology system, particularly a solid-state detector, of the type having a raster that can be arranged in front of the receiver plane in the beam path and that can be moved into a standby position out of the beam path when not in use.

2. Description of the Prior Art

Target devices are known wherein the raster or film used to generate static radiographic exposures is movable to a position outside of the X-ray beam path for operating the imaging device in a fluoroscopic mode, so as to reduce the generation of stray radiation in the fluoroscopic mode. Usually the static image receiver is moved to the standby mode outside of the beam path by a motor.

With solid-state technology, it has become possible to construct considerably more compact image receivers and therefore more compact X-ray pick-up and fluoroscopy devices. In these smaller devices, however, the lateral standby space for the raster, that was unproblematically present in the conventional large-volume target devices, no longer exists.

SUMMARY OF THE INVENTION

It is an object of the invention to construct an image receiver of the above described type wherein it is possible to move the raster in an idle (standby) position without compromising the compact design.

This object is inventively achieved in an image receiver for a radiologically system having a raster and a standby receptacle mount for the raster in the receiver housing, preferably on the side of the recording cassette that faces away from the radiation source.

The placement of the raster in a standby position thus is inventively accomplished not by a mere lateral sliding into a standby receptacle that is arranged next to the image receiver, nor is it necessary to remove the raster from the device and store it somewhere else in a cabinet, where it is not available sufficiently promptly or cannot be found quickly enough or can be damaged. Instead, the raster is moved into a standby position at the compact image receiver, this position being substantially congruent to the usage position, but on the side of the image receiver facing away from the radiation source.

In an embodiment of the image receiver housing such that the raster can be placed on the bottom of the receiver housing. In one position, it is located in the path of the X-ray source, and upon reattaching it is located on the underside and accommodated in its standby position in a space-efficient manner with out the necessity of laterally extending the housing and without being located in the beam path.

In a further embodiment of the invention, guides for pushing in the raster into the working position and into the standby position, that is parallel to the working position, are connected to one another by connecting guide arcs. This embodiment functions simply and reliably, since it is impossible for the raster to be lost or misplaced or for it to de dropped. The raster is pulled out of the guides in the working position, for instance with a handle, and it slides downwardly along the connecting guide arcs, whereupon it can be pushed into the standby position. The change in the opposite direction proceeds just as simply and reliably.

In a further embodiment, this shifting from the working plane into the standby plane, which are respectively arranged on opposite sides of the solid-state detector, takes place inside a closed expansion bellows, so that the raster is not exposed during the change of positions and thus remains protected. For the position change, the expansion bellows is extended (by hand or by motor), then the change of planes occurs, and, when this is completed, the expanding bellows is pushed in again, so that, having no notable lateral space requirement, the compact structure of the image receiver is not compromised.

DESCRIPTION OF THE PREFERRED EMBODIMENTS

Figure 1:
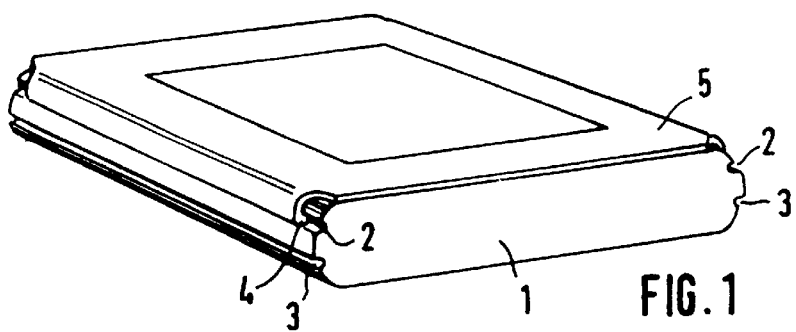
FIG. 1 is a perspective view of an inventive image receiver with a solid-state detector and a raster that can be attached such that it can be repositioned from the top to the bottom.

In the exemplary embodiment illustrated in FIG. 1, the housing 1 of an image receiver having a solid-state detector that can be pushed in and out from the back (which is not illustrated) is provided with lateral guide grooves 2 and 3 that make it possible to place or snap a raster 5, that is provided with corresponding edge guide ribs 4, selectively onto the bottom or the top as illustrated. Assuming that the receiving side of the detector housing, which is arranged opposite the X-ray source, the patient being arranged between the two, is the top side, the depicted position of the raster is the working position. By removing the raster and replacing it on the bottom side, it is put into a space-efficient standby position without compromising the compact design of the image receiver. Such a compromising of the compact size occurred in known target devices having a standby position arranged laterally next to the image receiver.

Figure 2:
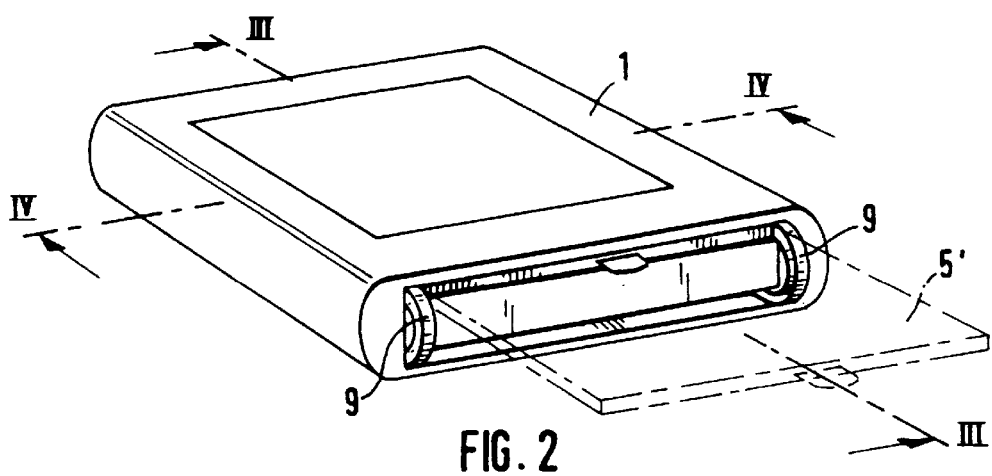
FIG. 2 is a perspective view of a modified version of the image receiver of FIG. 1, in which the raster can be moved between positions of insertion located above and below the solid-state detector.
Figure 3:
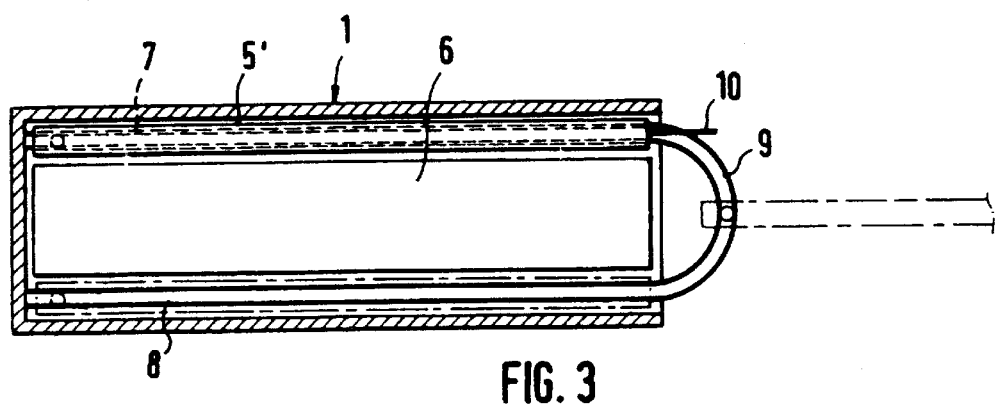
FIG. 3 is a longitudinal section along the line III—III through the arrangement as illustrated in FIG. 2.
Figure 4:
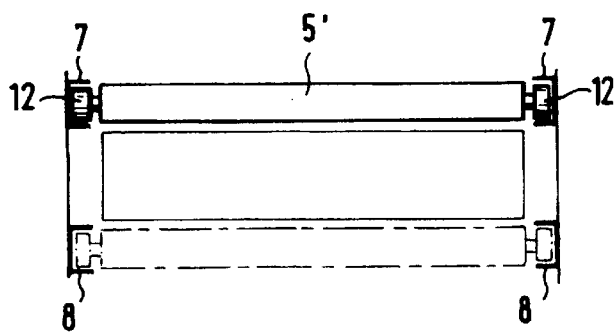
FIG. 4 is a cross-section along the line IV—IV through the arrangement as illustrated in FIG. 2.

In the exemplary embodiment illustrated in the FIGS. 2 to 4, shafts for accepting the raster 5' are respectively provided in the housing of the image receiver above and below the solid-state detector 6, that is schematically indicated as a box. The raster 5' is provided with lateral guides, for instance guide rollers 12, which can be pushed into U-shaped or C-shaped rails 7,8. In the exemplary embodiment, these guide rails are additionally connected to one another by connecting guide arcs 9. With the aid of a handle 10, it is possible to pull the raster out of the upper working position in the guide rails 7, for example, whereby the rollers 12 proceed from the guide rails 7 into the connecting guide arcs 9 and from these arc 9 automatically into the guide rails 8 of the bottom standby position. In this embodiment with a permanent connection of the raster 5' to the housing 1, the raster 5' cannot be lost or misplaced and cannot fall.

Figure 5:
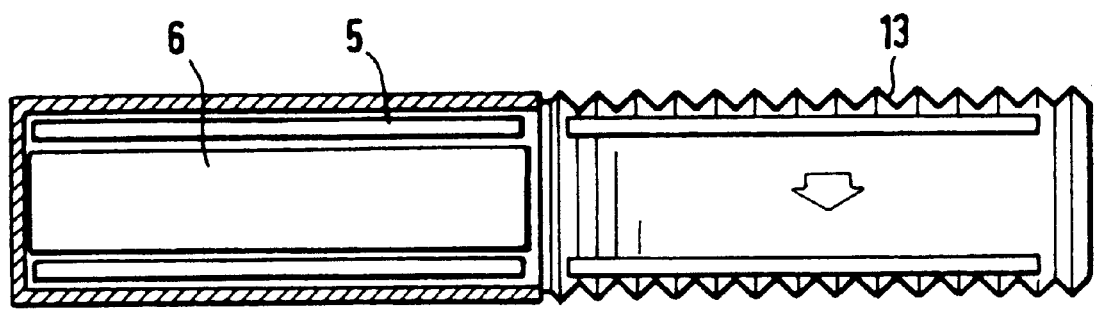
FIG. 5 is a schematic longitudinal section through a further embodiment of an inventive image receiver wherein the moving of the raster between the different insertion positions in the image receiver housing takes place so as to be concealed in a laterally expanding bellows.

FIG. 5 schematically depicts an embodiment in which moving of the raster takes place approximately corresponding to the exemplary embodiment of FIGS. 2 to 4 from the position above the solid-state detector 6 into a position below the solid-state detector 6, but wherein the repositioning occurs concealed and contained inside an expanding bellows 13 with the aid of a motorized repositioning means, which is not illustrated. Subsequent to the repositioning, the expanding bellows 13 is again compressed, and so the bellows 13 practically do not increase the space requirement of the compact image receiver at all.

Although modifications and changes may be suggested by those skilled in the art, it is the intention of the inventor to embody within the patent warranted hereon all changes and modifications as reasonably and properly come within the scope of his contribution to the art.

I claim as my invention:

1. An image receiver for a radiology system having a radiation source, said image receiver comprising:

a receiver housing having a first side adapted to face toward said radiation source and a second side adapted to face away from said radiation source;

a radiation detector having a receiver plane disposed in said receiver housing;

a movable raster for obtaining static radiological images; and a mount for said raster in said receiver housing for holding said raster in front of said receiver plane and for selectively allowing movement of said raster to a standby position at said second side of said receiver housing.

2. An image receiver as claimed in claim 1 wherein said mount allows movement of said raster to a position on said receiver housing at said second side.

3. An image receiver as claimed in claim 1 wherein said mount includes guide rails for moving said raster from said position in front of said receiver plane to said standby position at said second side of said receiver housing, with said position in front of said receiver plane and said standby position being connected by guide arcs along which said raster moves.

4. An image receiver as claimed in claim 1 further comprising an extensible covering for said mount allowing movement of said raster from said position in front of said receiver plane to said standby position without exposing said raster to ambient light.

5. An image receiver as claimed in claim 1 wherein said radiation detector is a solid-state radiation detector.

* * * * *